(12) United States Patent
Calvo et al.

(10) Patent No.: US 8,907,951 B2
(45) Date of Patent: Dec. 9, 2014

(54) METHOD, SYSTEM AND COMPUTER-READABLE MEDIUM FOR PROVIDING A USER INTERFACE FOR PREDICTING THE PHYSICAL ATTRIBUTES OF A PROPOSED WELL

(75) Inventors: Mariano Calvo, Redwood Meadows (CA); Ryan Kong, Calgary (CA); Terry Yee, Calgary (CA)

(73) Assignee: Pason Systems Corp., Calgary (CA)

( * ) Notice: Subject to any disclaimer, the term of this patent is extended or adjusted under 35 U.S.C. 154(b) by 556 days.

(21) Appl. No.: 13/015,124

(22) Filed: Jan. 27, 2011

(65) Prior Publication Data

US 2011/0216066 A1 Sep. 8, 2011

Related U.S. Application Data

(60) Provisional application No. 61/298,865, filed on Jan. 27, 2010.

(51) Int. Cl.
  *G06T 11/20* (2006.01)
(52) U.S. Cl.
  CPC ........................................ *G06T 11/20* (2013.01)
  USPC .......................................................... 345/440
(58) Field of Classification Search
  None
  See application file for complete search history.

(56) References Cited

U.S. PATENT DOCUMENTS

| | | | | |
|---|---|---|---|---|
| 6,012,017 A | * | 1/2000 | Van Bemmel et al. | 702/14 |
| 6,408,953 B1 | * | 6/2002 | Goldman et al. | 175/39 |
| 2003/0014617 A1 | * | 1/2003 | Tamboli et al. | 713/1 |
| 2007/0276604 A1 | * | 11/2007 | Williams et al. | 702/16 |

OTHER PUBLICATIONS

Allen et al., "Modeling Logs for Horizontal Well Planning and Evaluation" Oilfield Review vol. 7 Issue 4, 1995.*
Petrolog, http://web.archive.org/web/20080722013819/http://www.petrolog.net/WebHelp/Petrolog_Desktop/Desktop_Existing_Stratas.htm , available online since Jul. 22, 2008.*

* cited by examiner

*Primary Examiner* — Tize Ma
*Assistant Examiner* — Yingchun He
(74) *Attorney, Agent, or Firm* — Katten Muchin Rosenman LLP

(57) ABSTRACT

A user interface for predicting the physical attributes of a proposed well by displaying an offset formation top graph for at least one offset well and a proposed formation top graph for the proposed well; mapping one or more portions of the offset formation top graph to one or more portions of the proposed formation top graph; normalizing physical attribute data associated with each mapped portion of the offset formation top graph to the associated mapped portion of the proposed formation top graph; displaying a normalized physical attribute graph of the normalized physical attribute data associated with each mapped portion of the offset formation top graph; selecting one or more portions of the normalized physical attribute graph; and determining the physical attribute data for the proposed well as the selected portions of the normalized physical attribute graph.

15 Claims, 13 Drawing Sheets

| MD [m] | Formation Top | PP [SG] | Formation Fault |
|---|---|---|---|
| 0.00 | Surface | 0.90 | ☐ |
| 628.0 | Ardley Coal | 0.90 | ☐ |
| 631.00 | Scollard | 0.90 | ☐ |
| 798.00 | Kneehill Tuft (Edmonton Group) | 0.90 | ☐ |
| 806.00 | Edmonton Group | 0.90 | ☐ |
| 1562.00 | Belly River | 0.90 | ☐ |
| 1891.00 | Lea park | 0.90 | ☐ |
| 2033.00 | Colorado | 0.90 | ☐ |
| 2152.00 | Backheart | 0.90 | ☐ |
| 2169.40 | Muskiki | 0.90 | ☐ |
| 2239.40 | Cardium Zone | 0.90 | ☐ |
| 2280.40 | Cardium Sand | 0.90 | ☐ |
| 2315.00 | Blackstone | 0.90 | ☐ |

Map target top to offset top

Map target top to offset top 1:1 depthwise from the start of the offset top

Where:
dt2-dt1 = do2-do1

Map target top to offset top 1:1 depthwise from the start of the offset bottom

Where:
dt2-dt1 = do2-do1

METHOD, SYSTEM AND COMPUTER-READABLE MEDIUM FOR PROVIDING A USER INTERFACE FOR PREDICTING THE PHYSICAL ATTRIBUTES OF A PROPOSED WELL

FIELD OF INVENTION

The present application relates to a user interface for predicting the physical attributes of a proposed well.

BACKGROUND

In well drilling applications, wells are typically drilled based upon a predetermined well plan that defines the well survey and drilling parameters. The determination of a well plan for a proposed well is typically based upon a variety of information, such as, geological surveys at or nearby the proposed well, recorded physical attributes of completed offset wells nearby the proposed well, and other sources of geological information. Based upon this information, a well plan for the proposed well can be generated to optimize desired drilling attributes, such as, bit wear, rate of penetration, and drilling time.

A common step in the generation of the well plan is the prediction of the physical attributes of the proposed well. This task is typically achieved by: correlating the predicted formation tops that are expected to be encountered in the drilling of the proposed well to the formation tops that were encountered during the drilling of completed offset wells nearby the proposed well; selecting the physical attributes associated with highly correlated portions of the formation tops of the offset wells, and predicting the physical attributes of the proposed well as a function of the selected physical attributes.

This process is typically non-intuitive, time intensive and prone to errors. Further, once a step in the process has been completed, any change to the criteria used for the step typically requires extensive and time-consuming re-calculations.

SUMMARY

The application provides, in part, a method, system and computer-readable medium for providing a user interface for predicting the physical attributes of a proposed well.

In one its aspects, the application provides a method of providing a user interface on a display for predicting the physical attributes of a proposed well, the method comprising:

(a) displaying an offset formation top graph of the formation top data for at least one offset well and a proposed formation top graph of the formation data for the proposed well;

(b) mapping one or more portions of the offset formation top graph to one or more portions of the proposed formation top graph, each mapped portion of the offset formation top graph mapped to an associated mapped portion of the proposed formation top graph;

(c) normalizing the physical attribute data associated with each mapped portion of the offset formation top graph to the associated mapped portion of the proposed formation top graph;

(d) displaying a normalized physical attribute graph of the normalized physical attribute data associated with each mapped portion of the offset formation top graph;

(e) selecting one or more portions of the normalized physical attribute graph; and (f) determining the physical attribute data for the proposed well as the selected portions of the normalized physical attribute graph.

The one or more offset wells may be a plurality of offset wells. The physical attribute data may be apparent rock strength data.

Each of the one or more portions of the offset formation top graph may represent a formation top of the offset well and each of the one or more portions of the proposed formation top graph may represent a formation top of the proposed well. The mapping may be based upon matching the name of each formation top in the formation top data for the proposed well to the names of the formation tops in the formation top data for the at least one offset wells.

The normalizing may modify the depth associated with each element of the physical attribute data by performing a linear interpolation based upon the depths of the mapped portion of the offset formation top graph and the depths of the associated mapped portion of the proposed formation top graph.

In another one its aspects, the application provides a system providing a user interface for predicting the physical attributes of a proposed well, the system comprising:

(a) a display;

(b) a processor communicatively coupled to the display and the input device;

(c) a memory communicatively coupled to the processor, the memory having statements and instructions stored therein for execution by the processor to:

(i) display on the display an offset formation top graph of formation top data for at least one offset well and a proposed formation top graph of the formation data for the proposed well;

(ii) map one or more portions of the offset formation top graph to one or more portions of the proposed formation top graph, each mapped portion of the offset formation top graph mapped to an associated mapped portion of the proposed formation top graph;

(iii) normalize physical attribute data associated with each mapped portion of the offset formation top graph to the associated mapped portion of the proposed formation top graph;

(iv) display on the display a normalized physical attribute graph of the normalized physical attribute data associated with each mapped portion of the offset formation top graph;

(v) select one or more portions of the normalized physical attribute graph; and (vi) determine the physical attribute data for the proposed well as the selected portions of the normalized physical attribute graph.

The one or more offset wells may be a plurality of offset wells. The physical attribute data may be apparent rock strength data.

Each of the one or more portions of the offset formation top graph may represent a formation top of the offset well and each of the one or more portions of the proposed formation top graph may represent a formation top of the proposed well. The mapping may be based upon matching the name of each formation top in the formation top data for the proposed well to the names of the formation tops in the formation top data for the at least one offset wells.

The normalizing may modify the depth associated with each element of the physical attribute data by performing a linear interpolation based upon the depths of the mapped portion of the offset formation top graph and the depths of the associated mapped portion of the proposed formation top graph.

In another one its aspects, the application provides a computer-readable medium having statements and instructions stored therein for execution by a processor to:

(d) display an offset formation top graph of formation top data for at least one offset well and a proposed formation top graph of the formation data for the proposed well;

(e) map one or more portions of the offset formation top graph to one or more portions of the proposed formation top graph, each mapped portion of the offset formation top graph mapped to an associated mapped portion of the proposed formation top graph;

(f) normalize physical attribute data associated with each mapped portion of the offset formation top graph to the associated mapped portion of the proposed formation top graph;

(g) display a normalized physical attribute graph of the normalized physical attribute data associated with each mapped portion of the offset formation top graph;

(h) select one or more portions of the normalized physical attribute graph; and (i) determine the physical attribute data for the proposed well as the selected portions of the normalized physical attribute graph.

The one or more offset wells may be a plurality of offset wells. The physical attribute data may be apparent rock strength data.

Each of the one or more portions of the offset formation top graph may represent a formation top of the offset well and each of the one or more portions of the proposed formation top graph may represent a formation top of the proposed well.

The mapping may be based upon matching the name of each formation top in the formation top data for the proposed well to the names of the formation tops in the formation top data for the at least one offset wells.

The normalizing may modify the depth associated with each element of the physical attribute data by performing a linear interpolation based upon the depths of the mapped portion of the offset formation top graph and the depths of the associated mapped portion of the proposed formation top graph.

BRIEF DESCRIPTION OF THE DRAWINGS

In order that the subject matter may be readily understood, embodiments are illustrated by way of examples in the accompanying drawings, in which:

FIG. 1 is a view of a proposed formation top screen of a user interface ("UI") according to one embodiment.

FIG. 2 is a view of an offset well attribute screen of a UI according to one embodiment.

FIG. 3 is a view of a mapping screen of a UI according to one embodiment.

FIG. 5 is a view of the mapping screen shown in FIG. 3 with a pop-up text box describing mappings of an offset FTL graph to a proposed formation top graph.

DETAILED DESCRIPTION

Figure 4:
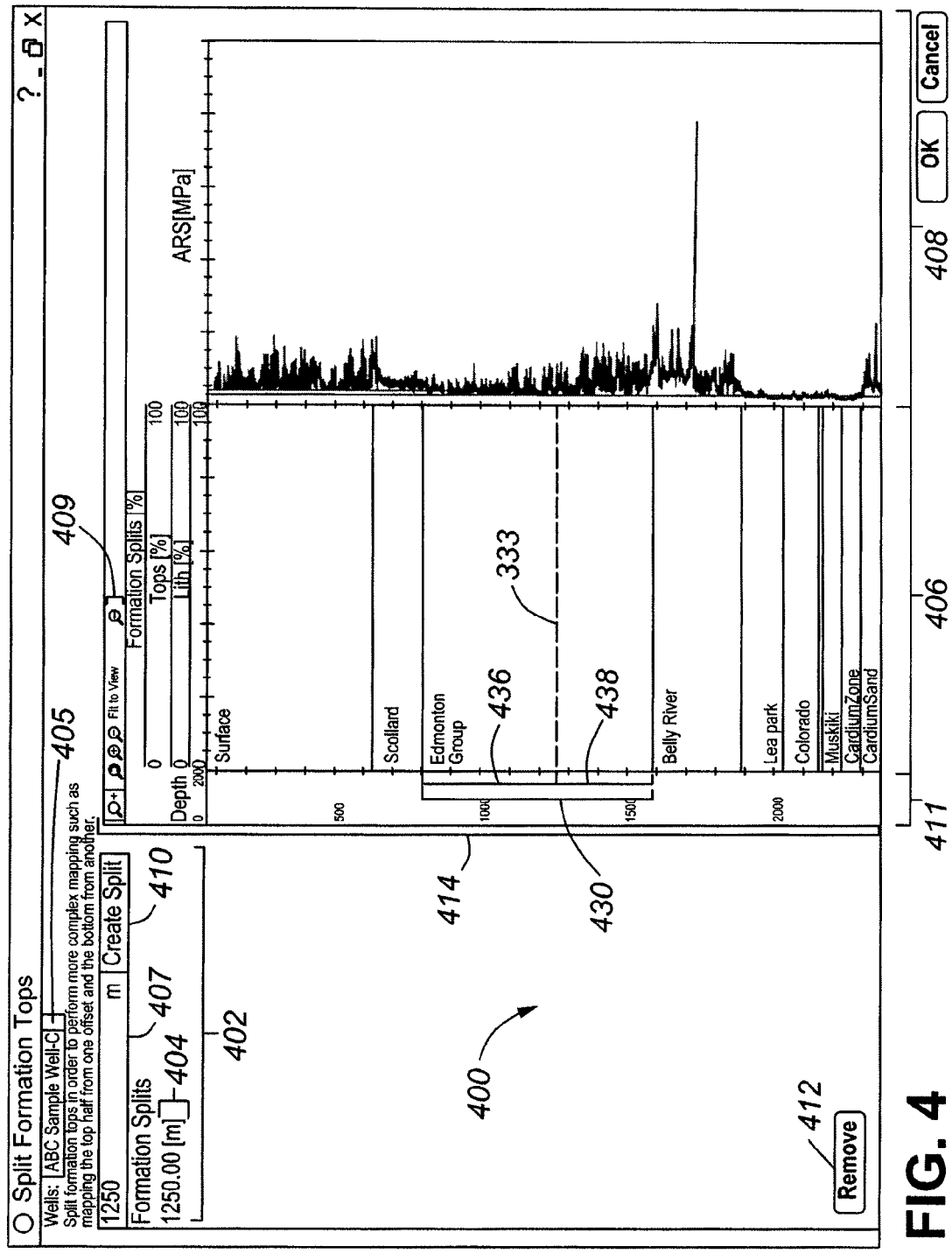
FIG. 4 is a view of a formation top split screen of a UI according to one embodiment.

The embodiments described herein generally relate to a user interface ("UI") for predicting the physical attributes of a proposed well. Specifically, the embodiments described herein relate to a method, system and computer-readable medium for providing a UI for predicting the physical attributes of a proposed well.

As used herein, the following terms have the following meanings: "formation top" refers the to a grouping of one or more rock strata referred by a single formation top name; "formation top data" refers to data pertaining to the name, depth and geological fault information of the formation tops encountered during the drilling of a well; "lithology" refers to the physical properties of a rock, such as, for example, mineralogy, grain size, and texture; "lithology data" refers to data pertaining to the lithology of one or more formation tops or portions thereof; "apparent rock strength" or "ARS" refers to an approximation of the unconfined compressive rock strength or strength of a rock when crushed in a uniaxial direction without lateral restraint; "ARS data" refers to data pertaining to the ARS for one or more formation tops or portions thereof; "well data" refers to the formation top data, lithology data and ARS data for a particular well; "physical attribute data" refers to data respecting one or more physical attributes of a well, including without limitation, formation top data, lithology data, and ARS data; "formation top graph" refers to a graph of formation top data for a well; "FTL graph" refers to a graph of formation top and lithlogy data for a well; "ARS graph" refers to a graph of ARS data for a well; "physical attribute graph" refers to a graph of one or more attributes of physical attribute data for a well; "measured depth" or "measured well depth" refers to the depth of a well measured along the wellbore; and "communicatively coupled" refers to communication between two devices and/or components, directly or indirectly through one or more intermediate devices and/or components, including without limitation, communication through one or more systems, networks, buffers, databases, or media.

Further, throughout the specification, where a "computer" is referenced it may include one or more computers located at one more locations communicating through one or more networks. Where a "processor" is referenced it may include one or more processors located at one more locations communicating through one or more networks, including without limitation, application specific circuits, programmable logic controllers, field programmable gate arrays, microcontrollers, microprocessors, virtual machines, electronic circuits and other processing devices known in the art. Where a "computer readable medium" or "memory" is referenced it may include one or more computer readable mediums located at one more locations communicating through one or more networks, including without limitation, random access memory, flash memory, hard disc drives, read-write optical drives and optical drive media, flash drives, and other computer readable storage media known in the art. Where a "network" is referenced it may include one or more networks, including without limitation, local area networks, wide area networks, intranets, the Internet, and other networks known in the art.

A UI according to one embodiment generally comprises four main screens: a proposed formation top screen for receiving data respecting the predicted formation tops in the proposed well; an offset well selection screen for receiving the formation top data, lithology data and ARS data for one or more completed offset wells; a mapping screen for mapping portions of the formation top data of the offset wells to portions of the formation top data of the proposed well, and a compose screen for determining lithology data and ARS data for the proposed well based on selected lithology data and ARS data of the offset wells.

As further described below, the UI is displayed to a user through a display and the user may interact with the UI through one or more input devices, such as, for example, a keyboard, a mouse pointer, a touch-screen, or similar electronic device for receiving information from a user.

Referring to FIG. 1, an embodiment of the proposed formation top screen is generally shown as item 100. Screen 100 facilitates the receipt of formation top data for the proposed well by manually entering the formation top data or importing the formation top data from a data file. Screen 100 comprises a formation top area 102 for displaying formation top data for the proposed well as a series of formation top entries 110. Each formation top entry 110 represents a single formation top and displays specific attributes of the formation top data associated with the formation top. In the present embodiment, each formation top entry 110 displays the depth 112 of the associated formation top, the name 114 of the associated formation top, and an indicator 118 indicating whether a geological fault is affecting the formation top associated with the present formation top entry 110 and the adjacent formation top directly preceding the formation top in a direction towards the surface of the proposed well. Alternatively, each formation top entry 110 may display any desired attributes of the formation top data associated with its formation top. The values of each attribute of the formation top data displayed in the formation top entries 110 may be modified by a user by selecting the attribute in the formation top entry 110 and manually entering a modified attribute value through one or more input devices. When the name 114 of the formation top is selected, a drop-down list (not shown) is displayed which provides the user with a list of predefined formation names stored in a formation top database.

Screen 100 also comprises an import button 104 for importing formation top data from a data file, an add button 106 for adding formation top entries 110 to the formation top area 102, and a remove button 108 for removing formation top entries 110 from the formation top area 102.

Figure 2:
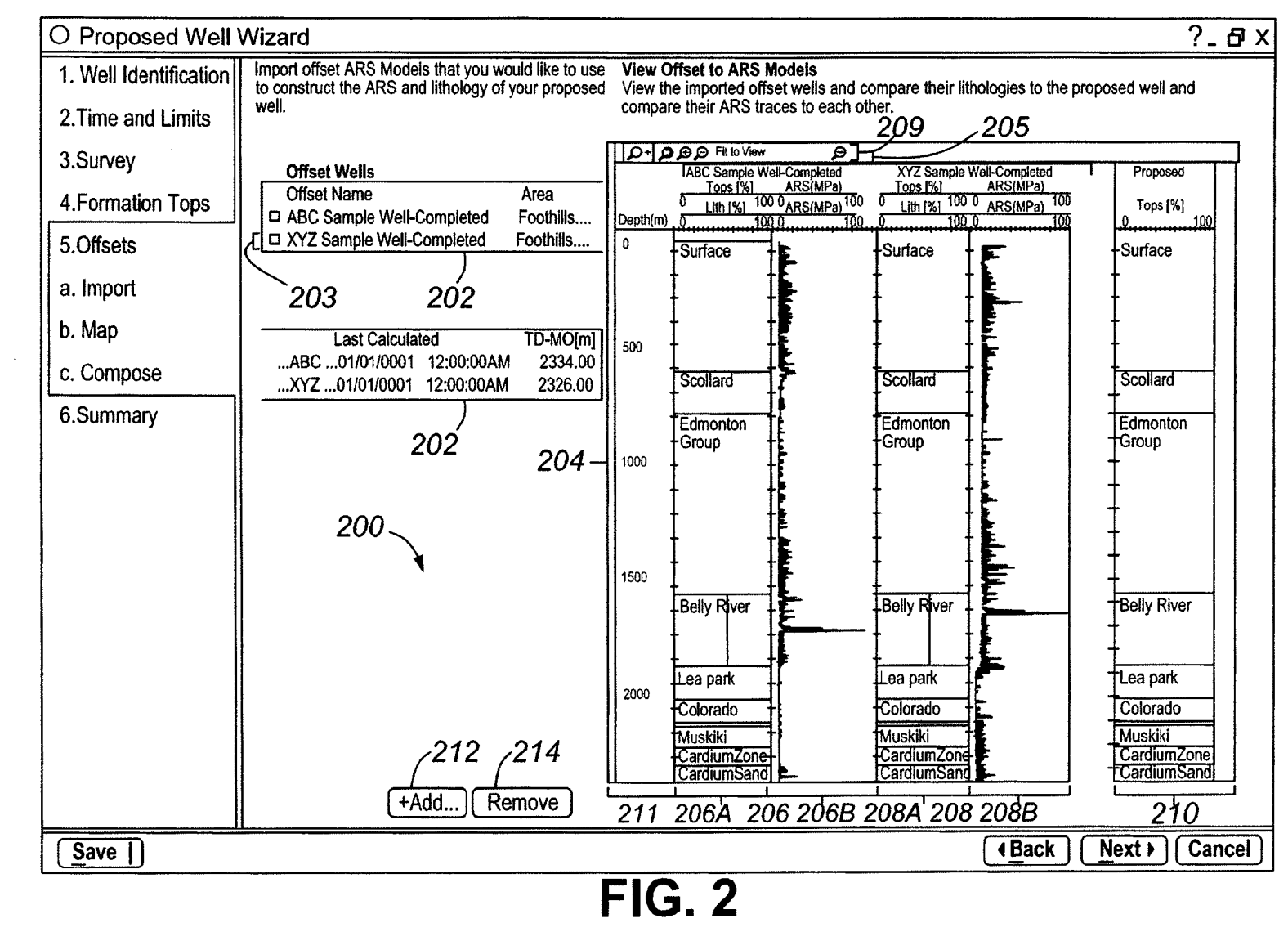

Referring to FIG. 2, an embodiment of the offset well selection screen is generally shown as item 200. Screen 200 facilitates the receipt and viewing of formation top data, lithology data and ARS data (collectively referred to as "well data") for desired offset wells. Screen 200 comprises: an add button 212 for importing well data for a selected offset well from a data file; a remove button 214 for removing well data imported for a selected offset well; and an offset identification area 202 for identifying selected offsets wells for which the user has elected to import well data. Each selected offset well is identified in the offset identification area 202 as an offset entry 203 comprising the name of the offset well, the area where the offset well is located, the date the well data for the offset well was last calculated, the total measured depth of the offset well, and the total time for the drilling of the offset well. Alternatively, each offset entry 203 may comprise any desired attributes of the offset well.

Screen 200 also comprises a viewing area 204 having an offset graph area 205 for displaying graphs of the well data for each selected offset well, a proposed formation top graph 210 of the formation top data for the proposed well received by screen 100, a well depth axis 211 for displaying a common well depth axis shared by the graphs in the viewing area 204, and a magnification area 209 providing buttons for adjusting the magnification of graphs in the viewing area 204. The offset graph area 205 is further divided into one or more sub-areas 206, 208, each comprising graphs of the well data for a selected offset well. Each sub-area 206, 208 displays a first graph 206A, 208A (referred to as a "FTL graph") of the formation top data and lithology data of the selected offset well, and a second graph 206B, 208B (referred to as an "ARS graph") of the ARS data of the selected offset well.

Offset ARS graphs 206B, 208B display a graph of the ARS data for the selected offset well. The ARS data is calculated at various points throughout the selected offset well using methods known in the art based upon the physical attributes of the well recorded during the drilling of the well. The magnitude of the ARS value, in Megapascals, is represented by the horizontal axis of the offset ARS graphs 206B, 208B, with increasing magnitude running from left to right, and the measured well depth, in meters, at which the ARS value was calculated is represented by the vertical axis of offset ARS graphs 206B, 208B, with increasing depth running from top to bottom. Offset FTL graphs 206A, 208A are analogous to offset FTL graph 306 provided below with respect to screen 300, the description of which is equally applicable to offset FTL graphs 206A, 208A.

Figure 3:
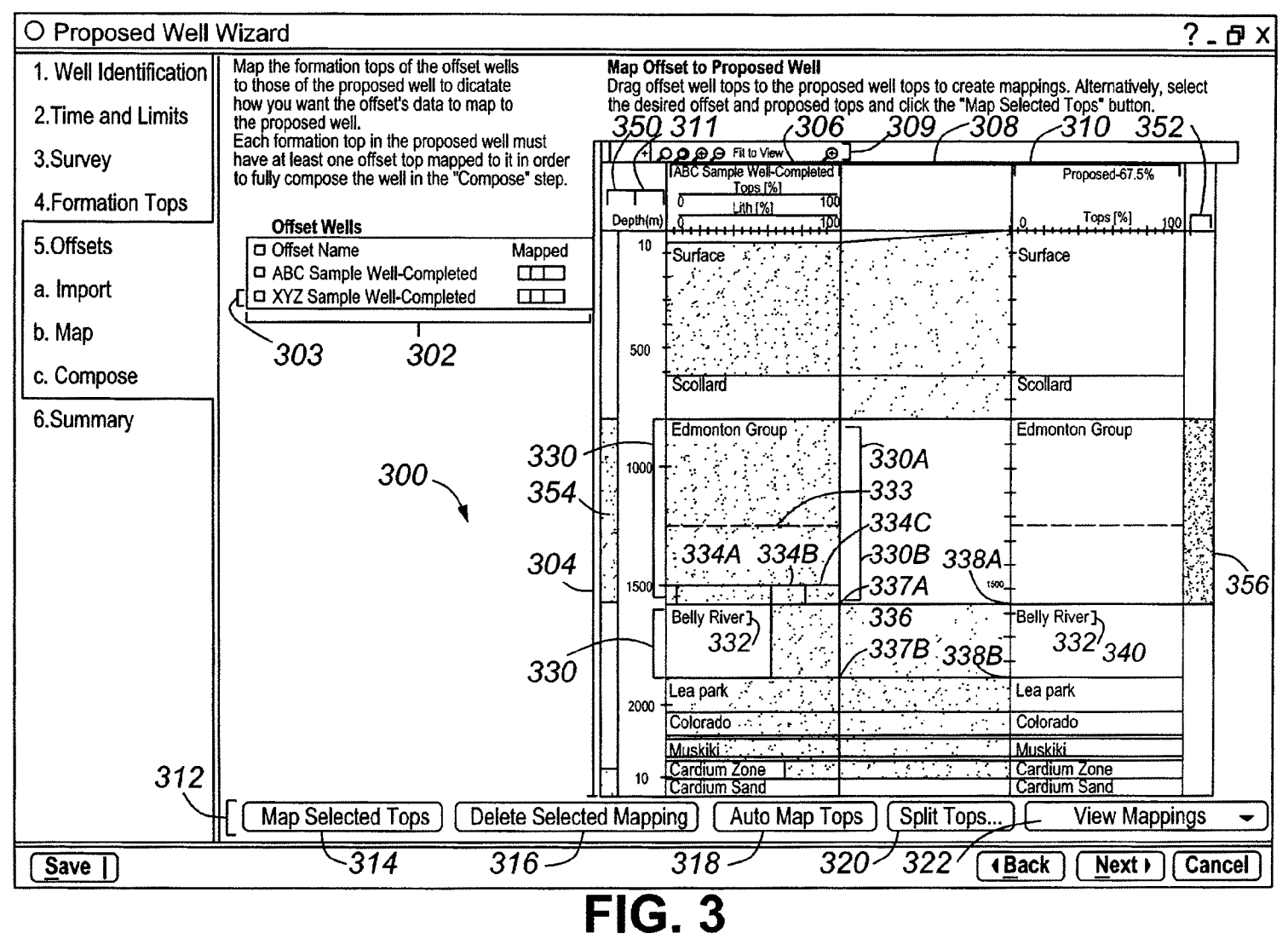

Referring to FIG. 3, an embodiment of the mapping screen is generally shown as item 300. Screen 300 facilitates the mapping of portions of the formation top data of the offset wells to portions of the formation top data of the proposed well. Screen 300 comprises an offset selection area 302 for identifying and selecting the offset wells that the user has selected in screen 200. Each offset well is identified in the offset selection area 302 as an offset entry 303 comprising the name of the offset well and the percentage of the formation top data for the offset well that has been mapped to the formation top data of the proposed well. Alternatively, each offset entry 303 may comprise any other attribute of the offset well and/or information on the mapping of the formation top data of the offset well to the formation top data of the proposed well. A user may select an offset entry 303 using an input device to view an offset FTL graph 306 of the formation top data and lithology data of the associated offset well and conduct the mapping of the formation top data of the offset well to the formation top data of the proposed well as further described below.

Screen 300 also comprises a mapping area 304 for graphically mapping portions of the formation top data of the offset wells to portions of the formation top data of the proposed well. Mapping area 304 generally comprises: an offset FTL graph 306; a mapping graph 308; a proposed formation top graph 310; a well depth axis 311 for displaying a common well depth axis shared by the graphs in mapping area 304; notification bars 350, 352 for identifying unmapped portions of the offset FTL graph 306 and the proposed formation top graph 310; and a magnification area 309 providing buttons for adjusting the magnification of the graphs in mapping area 304.

The offset FTL graph 306 displays a graph of the formation top data and lithology data for a selected offset well. The offset FTL graph 306 comprises a plurality of sections 330 representing the formation tops encountered in the drilling of the offset well. The sections 330 are displayed in the vertical order in which their associated formation tops are encountered during the drilling of the offset well, namely, the section 330 associated with the first formation top encountered during drilling is displayed at the top of the offset FTL graph 306, the section 330 associated with the second formation top encountered during drilling is displayed directly below the section 330 associated with the first formation top encountered during drilling, and so on. Each section 330 is also vertically positioned and sized with respect to the well depth axis 311 such that the measured depth indicated on the well depth axis 311 for the top and bottom of the section 330 matches the depth of the top and bottom of the formation top associated with the section 330. Each section 330 comprises the name 332 of the formation top and a graphic portion 334 that indicates the lithology of the formation top associated with the section 330. The graphic portion 334 may comprise one or more sub-portions 334A-C, each having a unique graphic indicating the presence of a particular rock type in the associated formation top. In addition, the width of each sub-portion 334A-C may represent the percentage of each rock type in the formation top associated with the section 330. In the present embodiment, the unique graphics comprise unique colours for each rock type. Alternatively, other graphics may be used to indicate rock-type, such as, for example, shading, hatching, and texturing. The rock-types and percentages of each rock type in the graphic portion 334 and sub-portions 334A-C, as well as, the top and bottom measured depth of the section 330, may also be indicated by a pop-up textbox (not shown) that is generated in response to a user selecting a graphic portion 334 and/or sub-portions 334A-C using an input device. The offset FTL graph 306 also displays splits 333 that are defined by a user, as further describe below, to divide a section 330 into two or more subsections 330A, 330B.

The proposed formation top graph 310 displays a graph of the formation top data for the proposed well. The proposed formation top graph 310 comprises a plurality of sections 340 representing the formation tops expected to be encountered in the drilling of the proposed well. The sections 340 are displayed in the vertical order in which their associated formation tops are expected to be encountered during the drilling of the well, namely, the section 340 associated with the first formation top expected to be encountered during drilling is displayed at the top of the proposed formation top graph 310, the section 340 associated with the second formation top expected to be encountered during drilling is displayed directly below the section 340 associated with the first formation top expected to be encountered during drilling, and so on. Each section 340 is also vertically positioned and sized with respect to the well depth axis 311 such that the measured depth indicated on the well depth axis 311 for the top and bottom of the section 340 matches the depth of the top and bottom of the formation top associated with the section 340. The top and bottom depth of the section 340 may also be indicated by a pop-up textbox (not shown) that is generated in response to a user selecting a formation top section 340 using an input device. Each section 340 comprises the name 332 of the formation top associated with the section 340. The proposed formation top graph 310 also displays splits 333 (not shown in graph) that are defined by a user as further describe below, to divide a section 340 into two or more subsections.

The mapping graph 308 is positioned between the offset FTL graph 306 and the proposed formation top graph 310, and displays graphical representations of mappings between selected portions of the offset FTL graph 306 and selected portions of the proposed formation top graph 310. Each portion of the offset FTL graph 306 and the proposed formation top graph 310 party to a mapping is referred to as a "mapped portion". Each mapped portion may comprise one or more sections 330, 340 and/or one or more subsections 330A, 330B. The mapping graph 308 comprises a plurality of mapping sections 336, each providing a graphical representation of a mapping between a mapped portion of the offset FTL graph 306 and a mapped portion of the proposed formation top graph 310. Each mapping section 336 comprises a shaded quadrilateral extending between a mapped portion of the offset FTL graph 306 and a mapped portion of the proposed formation top graph 310. The quadrilateral of each mapping section 336 is defined by: a first side extending along an edge of the offset FTL graph 306 between the starting depth 337A and the ending depth 337B of an associated mapped portion of the offset FTL graph 306; a second side extending along an edge of the proposed formation top graph 310 between the starting depth 338A and the ending depth 338B of an associated mapped portion of the proposed formation top graph 310; a third side extending between the starting depths 337A, 338A of the mapped portions of the offset FTL graph 306 and the proposed formation top graph 310; and a fourth side extending between the ending depths 337B, 338B of the mapped portions of the offset FTL graph 306 and the proposed formation top graph 310. The boundaries of each mapping section 336 may also be displayed in a textual form in a pop-up textbox (not shown) that is generated in response to a user selecting the mapping section 336 using an input device.

Notification bars 350, 352 function to identify unmapped portions of the offset FTL graph 306 and the proposed formation top graph 310. Notification bar 350 identifies unmapped portions of the offset FTL graph 306 by colouring sections 354 of the notification bar 350 next to each unmapped portion of the offset FTL graph 306. Similarly, notification bar 352 identifies unmapped portions of the proposed formation top graph 310 by colouring sections 356 of the notification bar 352 next to each unmapped portion of the proposed formation top graph 310. Each unmapped portion may comprise one or more sections 330, 340 and/or one or more sub-sections 330A, 330B.

Screen 300 also comprises a mapping function area 312 having a plurality of buttons for executing a variety of mapping functions. In the present embodiment, mapping function area 312 comprises a map selected tops button 314, a delete selected mapping button 316, an auto map tops button 318, a split tops button 320, and a view mappings button 322. Alternatively, the mapping function area 312 may comprise any desired mapping functions.

Selection of the split tops button 320 results in the display of a formation top split screen 400 as shown in FIG. 4. Screen 400 facilitates the division of the sections 330, 340 of the offset FTL graph 306 and proposed formation top graph 310 of screen 300 into two or more subsections through the application of splits 333. Screen 400 comprises: a well selection drop-down list 405 for selecting a well for which to apply or remove a split 333 from its associated graph 306, 310; a split text entry box 407 for entering the measured depth at which to insert a split into the selected graph 306, 310; and a create split button 410 for applying the split entered into the split text entry box 407 to the selected graph 306, 310. Screen 400 also comprises a split identification area 402 for identifying the splits that have been applied to the selected graph 306, 310 and a remove button 412 for removing splits from the selected graph 306, 310. Each split is identified in the split identification area 402 as a split entry 404 comprising the measured depth at which the split is made. Alternatively, each split entry 404 may comprise any other desired attributes of the split or well data of selected graph 306, 310. Split entries 404 may be removed by selecting a split entry 404 followed by selecting the remove button 412, which also results in the removal of the associated split 333 from the selected graph 306, 310.

Screen 400 also comprises a viewing area 414 displaying a graph 406 of the offset FTL graph 306 of screen 300 associated with the selected well if the selected well is an offset well, or the proposed formation top graph 310 of screen 300 if the selected well is the proposed well. The viewing area 414 also comprises a graph 408 of the offset ARS graph 206B, 208B associated with the selected well if the selected well is an offset well, or an unpopulated ARS graph if the selected well is the proposed well. In addition, the viewing area 414 comprises a well depth axis 411 displaying a common well depth axis shared by graphs in the viewing area 414, and a magnification area 409 providing buttons for adjusting the magnification of the graphs in the viewing area 414. Upon completion of the addition or removal of splits 333 through screen 400, screen 300 is updated to display any added splits 333 and remove any removed splits 333.

Referring again to FIG. 3, the map selected tops button 314 facilitates the manual mapping of a mapped portion of the offset FTL graph 306 to a mapped portion of the proposed formation top graph 310. In order to manually map a portion of the offset FTL graph 306 to a portion of the proposed formation top graph 310, a user selects with an input device the portion of the offset FTL graph 306 and the portion of the proposed formation top graph 310, followed by selection of the map selected tops button 314. The screen 300 is then updated to reflect the mapping by displaying a mapping section 336 in the mapping graph 308 extending between the mapped portions of the offset FTL graph 306 and the proposed formation top graph 310, and removing any coloured sections 354, 356 in the notification bars 350, 352 next to the mapped portions.

The manual mapping of a mapped portion of the offset FTL graph 306 to a mapped portion of the proposed formation top graph 310 may also be achieved by using an input device to select the portion of the offset FTL graph 306 and drag-and-drop the portion over the portion of the proposed formation top graph 310.

The delete selected mapping button 316 facilitates the manual deletion of a mapping between a mapped portion of the offset FTL graph 306 and a mapped portion of the proposed formation top graph 310. In order to manually delete a mapping between a mapped portion of the offset FTL graph 306 and a mapped portion of the proposed formation top graph 310, a user uses an input device to select the mapped portion of the offset FTL graph 306 and the mapped portion of the proposed formation top graph 310, followed by the selection of the delete selected mapping button 316. The screen 300 is then updated to reflect the deleted mapping by: removing the mapping section 336 in the mapping graph 308 extending between the selected portions of the offset FTL graph 306 and the proposed formation top graph 310; displaying a coloured section 354 in notification bar 350 next to the selected portion of the offset FTL graph 306 if the selected portion is not mapped to any other portion of the proposed formation top graph 310; and displaying a coloured section 356 in notification bar 352 next to the selected portion of the proposed formation top graph 310 if the selected portion is not mapped to any portion of the offset FTL graphs 306 for other offset wells.

The auto map tops button 318 facilitates the automatic mapping of portions of the offset FTL graph 306 to portions of the proposed formation top graph 310 using an auto-mapping method further described below. At the completion of the auto-mapping method, the screen 300 is updated to reflect the mappings by displaying mapping sections 336 in the mapping graph 308 extending between mapped portions of the offset FTL graph 306 and the proposed formation top graph 310, and removing any coloured sections 354, 356 in notification bars 350, 352 next to the mapped portions.

In addition, when the screen 300 is initially displayed to the user, the auto-mapping method is automatically executed to map portions of the offset FTL graph 306 to portions of the proposed formation top graph 310.

Figure 5:
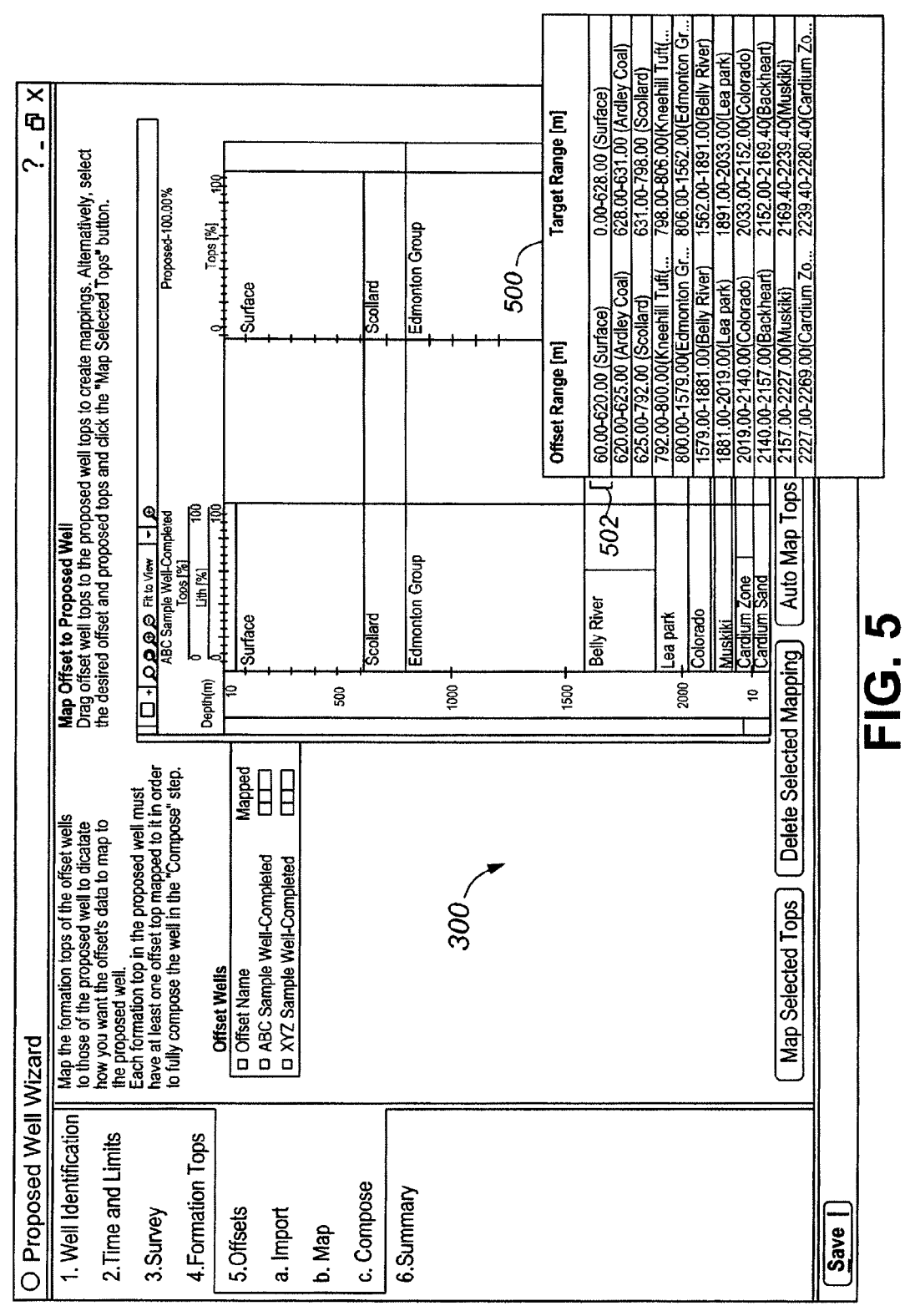

Selection of the view mappings button 322 results in the display of a pop-up text-box describing the mappings between offset FTL graph 306 and the proposed formation top graph 310. Referring to FIG. 5, screen 300 is shown with a pop-up text-box 500 displayed in response to the selection of the view mappings button 322. The text-box 500 comprises a mapping entry 502 for each mapping between the offset FTL graph 306 and the proposed formation top graph 310. Each mapping entry 502 comprises the starting points 337A, 338A and ending points 337B, 338B of the mapped portions of the offset FTL graph 306 and proposed formation top graph 310, as well as, the name 332 of the formation top associated with each mapped portion.

Figure 6:
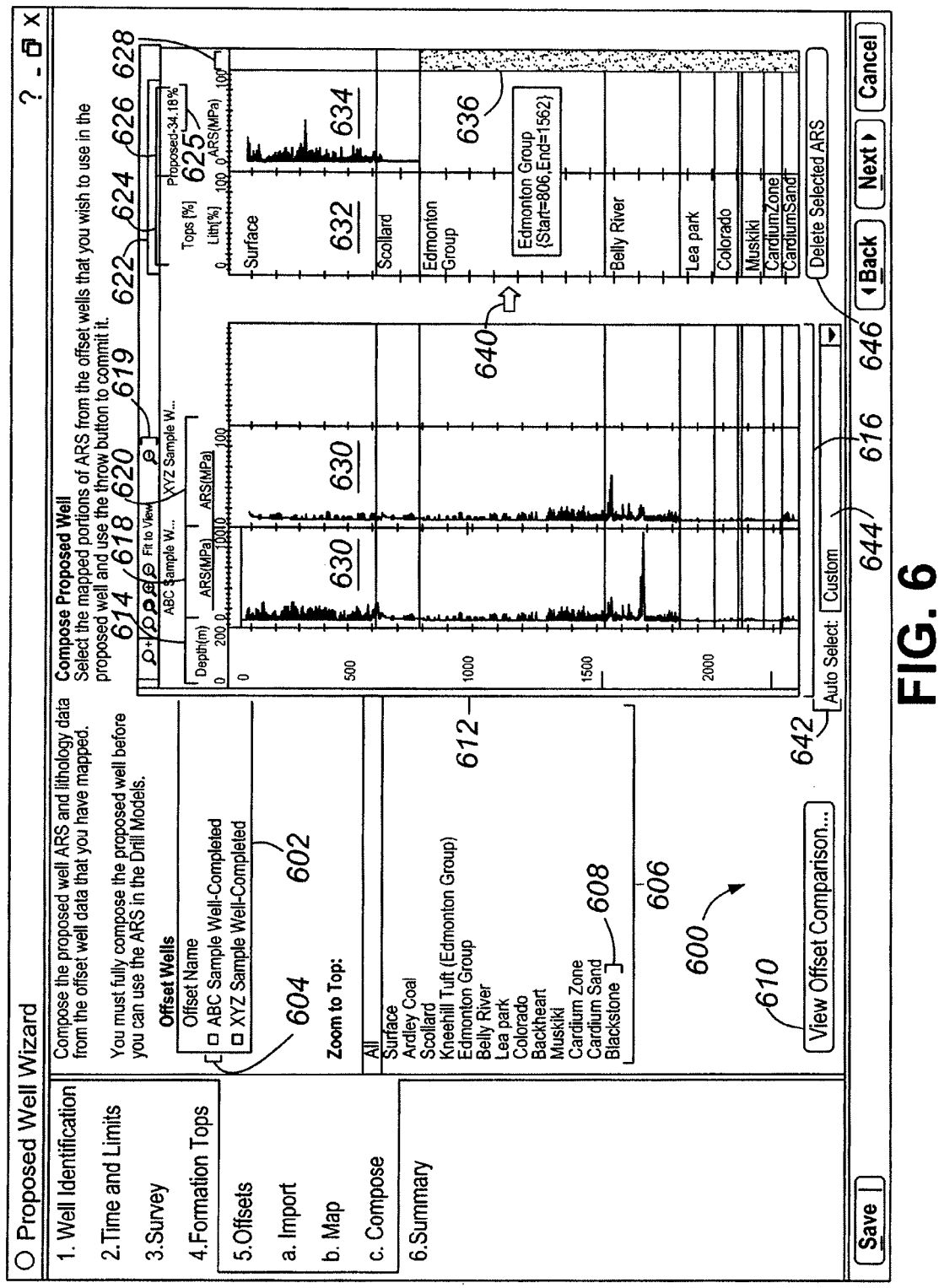
FIG. 6 is a view of a compose screen of a UI according to one embodiment.

Referring to FIG. 6, an embodiment of the compose screen is generally shown as item 600. Screen 600 facilitates the selection and transfer of ARS data and lithology data from the offset wells to predict the ARS data and lithology data of the proposed well. Screen 600 comprises an offset identification area 602, a formation top selection area 606, an ARS transfer area 612, and an ARS transfer function area 642. The offset identification area 602 identifies the offset wells that the user has selected in screen 200. Each offset well is identified in the offset identification area 602 as an offset entry 604 comprising the name of the offset well.

The ARS transfer area 612 comprises: an offset graph area 616 having normalized ARS graph 618, 620 of the mapped portions of each offset well; a proposed graph area 622 having a proposed FTL graph 624 and a proposed ARS graph 626; a well depth axis 614 for displaying a common well depth axis shared by the graphs in the ARS transfer area 612; a notification bar 628 for identifying portions of the proposed FTL graph 624 and the proposed ARS graph 626 that have not been populated by a transfer; and a magnification area 619 providing buttons for adjusting the magnification of the graphs in the ARS transfer area 612.

The offset graph area 616 comprises a normalized ARS graph 618, 620 for each offset well, divided into a plurality of sections 630. Each section 630 corresponds to, is in vertical alignment with, and has identical dimensions to, a mapped portion 632 of the proposed FTL graph 624. Each section 630 comprises an ARS graph of the ARS data associated with the portion of the offset FTL graph 306 that was mapped to the equivalent mapped portion 632 of the proposed formation top graph 310 in screen 300, if any. If a mapped portion 632 was not mapped to a portion of the offset FTL graph 306 in screen 300, the section 630 corresponding to the mapped portion 632 will be blank. Further, the ARS graph displayed in each section 630 is normalized such that the ARS graph is linearly scaled along the well depth axis 614 such that the ARS graph fits into and fills the section 630. The normalization is determined using the normalization method further described below. The normalized ARS graph 618, 620 provides a tool that permits a user to visually compare trends in the ARS data of a plurality of offset wells in a side-by-side and normalized manner. Stated another way, each normalized ARS graph 618, 620 displays what the ARS data of a proposed well would look like if the ARS data of the offset well was mapped to the proposed well according to the mappings specified in screen 300. Using the normalized ARS graph 618, 620, a user can quickly and intuitively determine the most appropriate portions of the ARS data to map to the proposed well to predict the physical attributes of the proposed well.

The proposed graph area 622 comprises a proposed FTL graph 624 and a proposed ARS graph 626. The proposed FTL graph 624 provides a graph of the formation top data of the proposed well corresponding to the proposed formation top graph 310 of screen 300, including any splits 333 applied thereto. The proposed FTL graph 624 is divided into a plurality of mapped portions 632 corresponding to the mapped portions of the proposed formation top graph 310 in screen 300. Upon the selection and transfer of ARS data and lithology data from an offset well to a mapped portion 632, as further described below, the mapped portion 632 is updated to display a lithology graph of the transferred lithology data along with the formation data as described above with respect to the offset FTL graph 306 of screen 300. At the top of area 622 is a transfer percentage indicator 625 that indicates the percentage of the proposed well for which lithology data and ARS data has been transferred.

The proposed ARS graph 626 provides a graph of the ARS data selected and transferred from an offset well, as further described below. The proposed ARS graph 626 is divided into a plurality of sections 634 corresponding to, in vertical alignment with, and having identical dimensions to, a corresponding mapped portion 632 of the proposed FTL graph 624 and a corresponding section 630 of the normalized ARS graphs 618, 620. The attributes of each section 634 depends on whether ARS data has been selected and transferred to the section 634 from a corresponding section 630 of the normalized ARS graphs 618, 620. If ARS data has been transferred to the section 634 from a corresponding section 630 of the offset ARS graphs 618, 620, then the section 634 has the attributes of, and displays a graph of, the normalized ARS data of corresponding section 630, otherwise, the section 634 is blank.

The notification bar 628 identifies sections 634 of the proposed FTL graph 624, and corresponding sections 632 of the proposed ARS graph 626, for which no lithology data or ARS data has been transferred from a corresponding section 630 of the normalized ARS graphs 618, 620, by colouring sections 636 of the notification bar 628 next to each non-transferred section 634 of the proposed ARS graph 626.

The ARS transfer area 612 also comprises a manual transfer button 640, an automatic selection drop-down list 644, and a delete selected ARS button 646. The manual transfer button 640 facilitates the manual transfer of the lithology data and ARS data associated with selected sections 630 of the normalized ARS graphs 618, 620 to corresponding sections 632, 634 of the proposed FTL graph 624 and the proposed ARS graph 626, respectively. To complete a transfer, a user selects one or more sections 630 of the offset ARS graphs 618, 620 using an input device, followed by the selection of the manual transfer button 640. The screen 600 will then be updated to reflect a transfer of the lithology data and ARS data associated with selected sections 630 of the normalized ARS graphs 618, 620 to corresponding sections 632, 634 of the proposed FTL graph 624 and the proposed ARS graph 626. Specifically, corresponding sections 632, 634 of the proposed FTL graph 624 and the proposed ARS graph 626 will be updated to display graphs of the transferred lithology data and ARS data, respectively, and any coloured sections 636 in notification bar 628 next to the transferred sections 632, 634 will be removed. When the user selects one or more sections 630 of the offset ARS graphs 618, 620, for each section 634 of the proposed ARS graph 626, the user will have a choice of transferring lithology data and ARS data from any one of the sections 630 of the normalized ARS graphs 618, 620 that correspond to section 634 of the proposed ARS graph 626. Specifically, the screen 600 will not permit a user to select two or more sections 630 of the normalized ARS graphs 618, 620 that correspond to the same section 634 of the proposed ARS graph 626.

The delete selected ARS button 646 facilitates the manual deletion of a lithology data and ARS data transferred to sections 632, 634 of the proposed FTL graph 624 and the proposed ARS graph 626, respectively. In order to manually delete transferred lithology data and ARS data, a user selects using an input device the sections 634 of the proposed ARS graph 626 for which transferred data is to be deleted, followed by selection of the delete selected ARS button 646. The screen 600 will then be updated to reflect the deletion by: removing the ARS graphs in the selected sections 634 of the proposed ARS graph 626; removing the lithology graphs in corresponding sections 632 of the proposed FTL graph 624; and displaying coloured sections 636 in notification bar 628 next to the selected sections 634.

The automatic selection drop-down list 644 provides a list of automatic selection functions that can be selected by a user using an input device to automatically select sections 630 of the offset ARS graphs 618, 620. In the present embodiment, the automatic selection functions comprise: maximum average ARS, minimum average ARS, all of selected well, clear and custom. The maximum average ARS function compares the average ARS of corresponding sections 630 of the normalized ARS graphs 618, 620 associated with a section 634 of the proposed ARS graph 626, and selects the section 630 having the highest average ARS. The minimum average ARS function compares the average ARS of corresponding section 630 of the normalized ARS graphs 618, 620 associated with a section 634 of the proposed ARS graph 626, and selects the section 630 having the lowest average ARS. The all of selected well function selects all of the sections 630 of a particular normalized ARS graph 618, 620. The clear function unselects all sections 630 of the normalized ARS graphs 618, 620. The custom function is presented in the drop-down list 644 when the user has made a manual selection or de-selection of one or more of the sections 630. The custom function does not automatically select or deselect any sections 630 of the normalized ARS graphs 618, 620.

The formation top selection area 606 facilitates the magnification of the graphs in ARS transfer area 612 to the portions of the graphs associated with a particular formation top. Each formation top in the proposed FTL graph 624 is listed in the formation top selection area 606 as formation top entry 608, comprising the name of the formation top. In response to the selection of a formation top entry 608 by a user using an input device, the screen 600 will be updated to magnify the graphs in the ARS transfer area 612 about the portions of the graphs associated with the formation top associated with the selected formation top entry 608.

Figure 7:
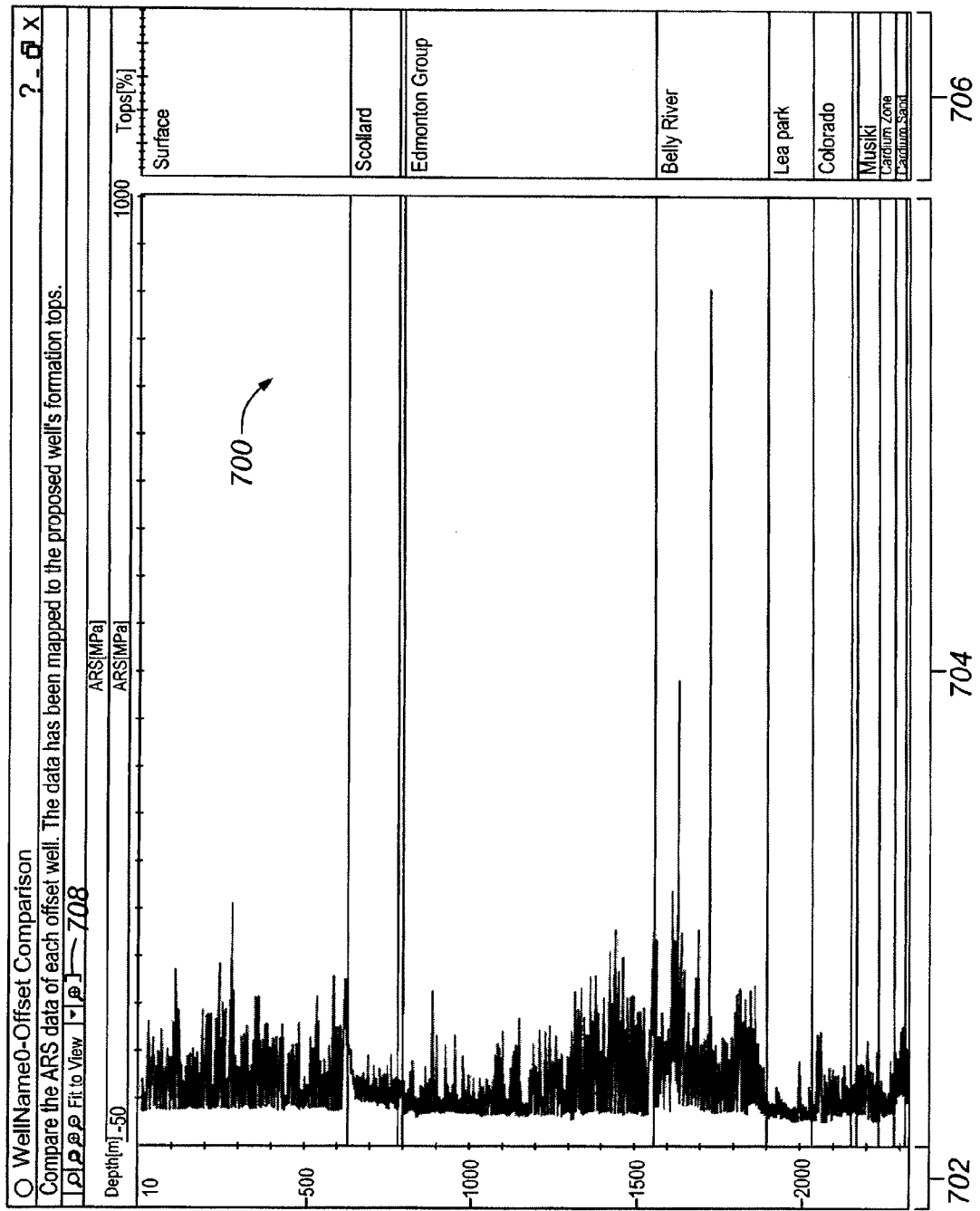
FIG. 7 is a view of an offset ARS comparison screen of a UI according to one embodiment.

The screen 600 also comprises a view offset comparison button 610. Selection of the view offset comparison button 610 results in the display of an offset comparison screen 700 as shown in FIG. 7. Screen 700 facilitates comparison of the offset ARS graphs 618, 620 of screen 600 by plotting all of the offset ARS graphs 618, 620 on a single graph. Screen 700 comprises an ARS comparison graph 704, a proposed formation top graph 706, a well depth axis 702 for displaying a common well depth axis shared by the ARS comparison graph 704 and the proposed formation top graph 706, and a magnification area 708 providing buttons for adjusting the magnification of the ARS comparison graph 704 and the proposed formation top graph 706. The ARS comparison graph 704 is identical to the offset ARS graphs 618, 620 of screen 600, except that the offset ARS graphs 618, 620 are displayed in a single graph resulting in the overlap of the graphs. The proposed formation top graph 706 is identical to the proposed formation top graph 310 of screen 300.

Figure 8A:
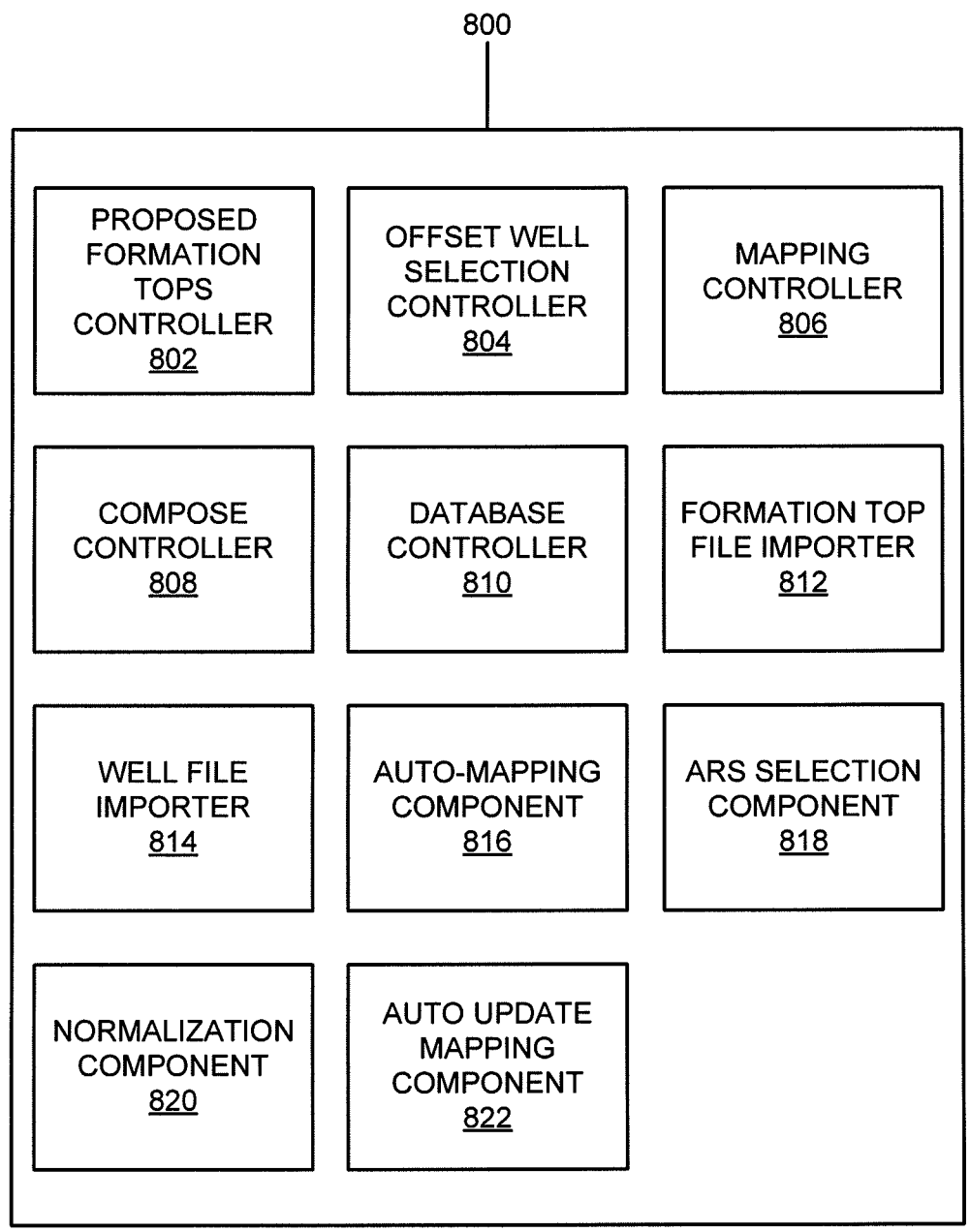
FIG. 8A is a diagram of the components of a computer-readable medium for providing a UI for predicting the physical attributes of a proposed well according to one embodiment.

Referring to FIG. 8A, a computer-readable-medium for providing a UI for predicting the physical attributes of a proposed well according to one embodiment is generally shown as item 800. The medium 800 contains statements and instructions stored therein that when executed by a processor provide the UI described above with respect to screens 100, 200, 300, 400, 500, 600 and 700. In particular, medium 800 comprises the following software components that interoperate to provide the UI described above: a proposed formation tops controller 802, a offset well selection controller 804, a mapping controller 806, a compose controller 808, a database controller 810, a formation top file importer 812, a well file importer 814, an auto-mapping component 816, an ARS selection component 818, a normalization component 820, and an auto update mapping component 822.

Figure 8B:
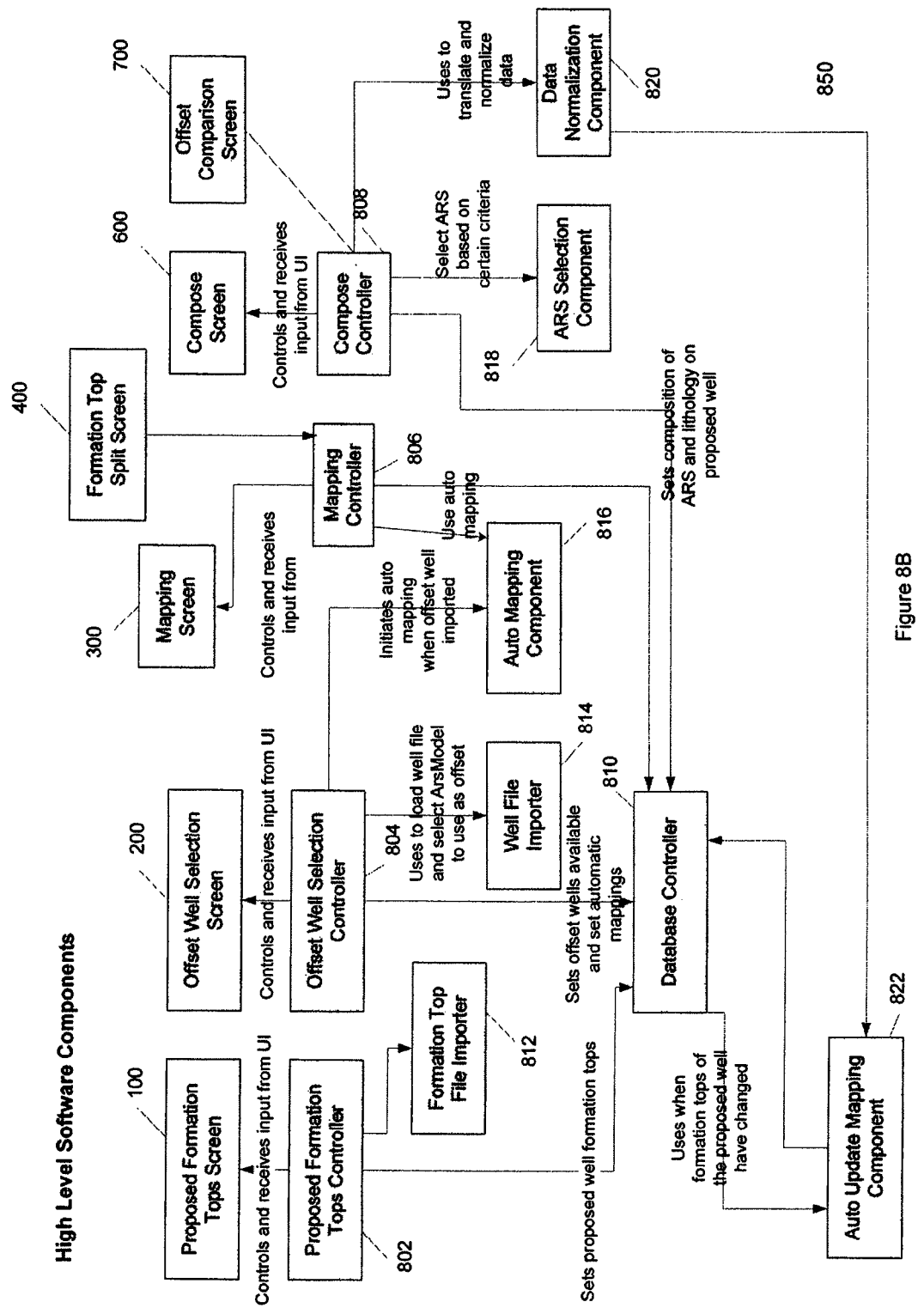
FIG. 8B is a system diagram showing the interconnection of the components shown in FIG. 8A.

Referring to FIG. 8B, a system diagram of the showing the interconnection of the components 802 to 822 shown in FIG. 8A is generally shown as item 850. The database controller 810 functions to manage a database to retrieve and store data utilized in the operation of the UI described above. The database contains a UI data structure configured to store data related to the operation of the UI, such as, for example: formation data, lithology data, and ARS data for the proposed well and selected offset wells; mapping data defining the mapping between mapped portions of the proposed formation top graph and offset FTL graphs; and the selection of lithology data and ARS data for the proposed well.

The proposed formation tops controller 802 manages the display and functionality of the proposed formation top screen 100 as described above. The controller 802 is communicatively coupled to the formation top file importer 812 and the database controller 810. When a user interacting with screen 100 selects the import button 104 shown in FIG. 1, the controller 802 directs the formation top file importer 812 to access a specified formation top data file for a proposed well and return the formation top data contained in the formation top data file. The controller 802 then displays the formation top data and interacts with the user as described above with respect to screen 100. In addition, once a user has completed the importation, creation, and/or modification of formation top data for a proposed well, the controller 802 directs the database controller 810 to store the formation top data in the UI data structure.

The formation top file importer 812 manages the access of formation top data files and the extraction of formation top data therefrom. When directed by the proposed formation tops controller 802, the importer 812 parses the specified formation top data file and extracts specific attributes of the formation top data that are then communicated to the controller 802. In the present embodiment, the importer 812 extracts the name and depth of each formation top identified in the formation top data file.

The offset well selection controller 804 manages the display and functionality of offset well selection screen 200 as described above. The controller 804 is communicatively coupled to the well file importer 814 and the database controller 810. When a user interacting with screen 200 selects the add button 212 shown in FIG. 2, the controller 804 directs the well file importer 814 to access a specified well data file for an offset well and return the well data contained in the well data file. The controller 804 then displays the well data and interacts with the user as described above with respect to screen 200. In addition, once a user has completed the selection and importation of well data for desired offset wells, the controller 804 directs the database controller 810 to store the well data in the UI data structure.

The well file importer 814 manages the access of well data files and the extraction of well data therefrom. When directed by the offset well selection controller 804, the importer 814 parses the specified well data file and extracts specific attributes of the well data that are then communicated to the controller 804. In the present embodiment, the importer 814 extracts ARS data, lithology data, formation top data, well identification information (name, area, location), and pore pressure data for each formation top.

The mapping controller 806 manages the display and functionality of mapping screen 300 and the formation top split screen 400 as described above. The controller 806 is communicatively coupled to the auto-mapping component 816 and the database controller 810. When screen 300 is initially presented to a user, and when the user selects the auto map tops button 318 shown in FIG. 3, the controller 806 directs the auto-mapping component to map portions of the offset FTL graph 306 to portions of the proposed formation top graph 310 shown in screen 300 using an auto-mapping method described below. In addition, once a user has completed mapping, the controller 806 directs the database controller 810 to store in the UI data structure mapping data defining the mapping between mapped portions of the proposed formation top graph 310 and offset FTL graphs 306.

Figure 9:
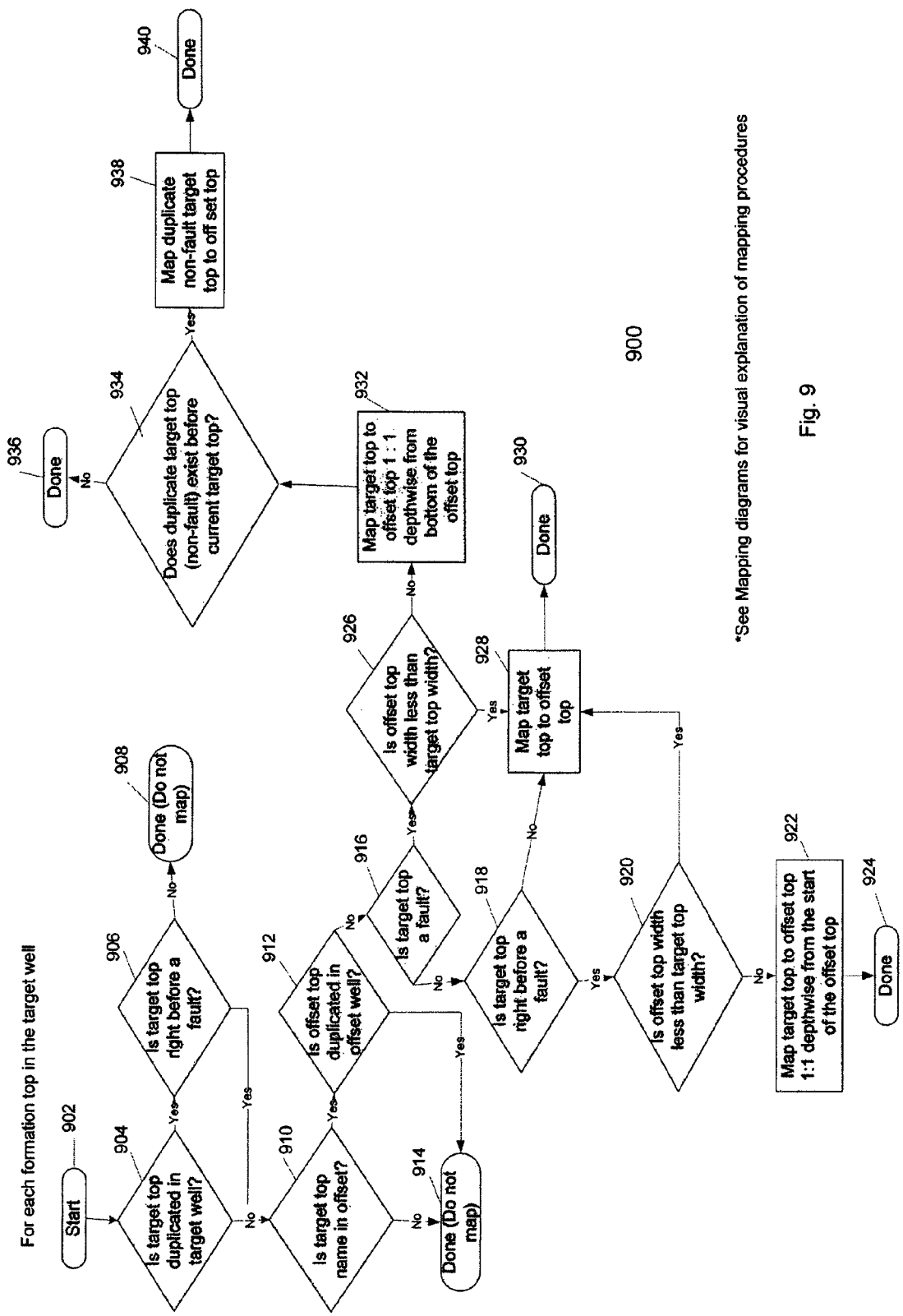
FIG. 9 is a logic diagram of an automatic mapping method according to one embodiment.

The auto-mapping component 816 executes an auto-mapping method that map portions of the offset FTL graph 306 to portions of the proposed formation top graph 310 shown in screen 300. Referring to FIG. 9, a logic diagram is providing describing the steps of an auto-mapping method 900 performed by the auto-mapping component 816 for each formation top identified in the formation top data for the proposed well.

In step 902, the method 900 is commenced with inputs comprising the formation top data for the proposed well, the formation top data for a selected offset well, and a selected proposed formation top from the formation data for the proposed well. The method 900 proceeds to step 904 where the formation top data for the proposed well is searched to determine if the proposed formation top is duplicated in the formation data by comparing the name of the proposed formation top to the names of all other formation tops identified in the formation top data. If the proposed formation top is duplicated, the method 900 proceeds to step 906, otherwise, the method proceeds to step 910.

In step 906, the formation top data of the proposed well is examined to determine if the proposed formation top is directly before a geological fault. If the proposed formation top is directly before a geological fault, the method proceeds to step 910, otherwise the method 900 proceeds to step 908 where the proposed formation top is not mapped and the method 900 is completed with respect to the proposed formation top.

In step 910, the formation top data for the offset well is searched to determine if the proposed formation top matches a formation top identified in the formation top data for the offset well by comparing the name of the proposed formation top against the names of the formation tops identified in the formation top data for the offset well. If the proposed formation top matches a formation top identified in the formation top data for the offset well (referred to as a "matched formation top"), the method 900 proceeds to step 912, otherwise the method 900 proceeds to step 914 where the proposed formation top is not mapped and the method 900 is completed with respect to the proposed formation top.

In step 912, the formation top data for the offset well is searched to determine if the matched formation top is duplicated by comparing the name of the matched formation top against the names of the other formation tops identified in the formation top data for the offset well. If the matched formation top is duplicated, the method 900 proceeds to step 914 where the proposed formation top is not mapped and the method 900 is completed with respect to the proposed formation top, otherwise, the method proceeds to step 916.

In step 916, the formation top data of the proposed well is examined to determine if the proposed formation top is a geological fault. If the proposed formation top is a geological fault, the method proceeds to step 926, otherwise the method 900 proceeds to step 918.

In step 918, the formation top data of the proposed well is examined to determine if the proposed formation top is directly before a geological fault. If the proposed formation top is directly before a geological fault, the method proceeds to step 920, otherwise the method 900 proceeds to step 928.

In step 920, the formation top data of the proposed well is examined to determine the thickness of the proposed formation top, and the formation top data of the offset well is examined to determine the thickness of the matched formation top. If the thickness of the matched formation top is less than the thickness of the proposed formation top, the method proceeds to step 928, otherwise the method proceeds to step 922.

Figure 10A:
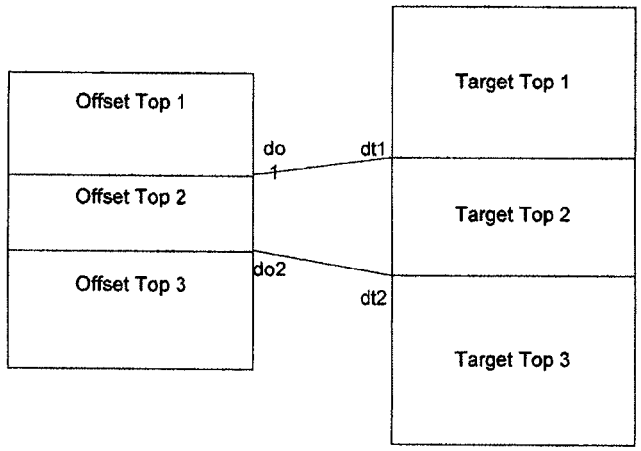
FIGS. 10A, 10B and 10C are diagrams of three different mapping methods utilized by the automatic mapping method shown in FIG. 9.
Figure 10B:
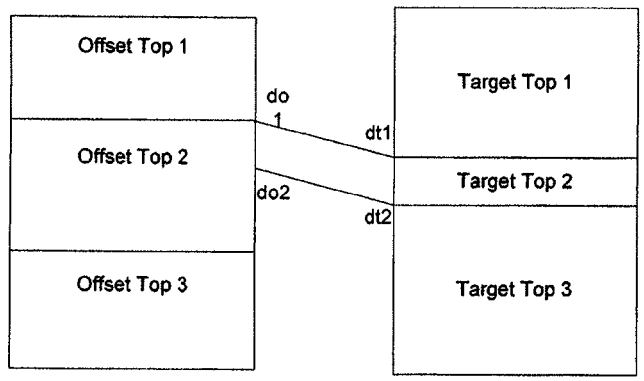

In step 922, the proposed formation top is mapped to the matched offset formation top in a one-to-one depthwise manner starting at the top of the selected proposed formation top, as graphically depicted in FIG. 10B. Specifically, the top of the proposed formation top is mapped to the top of the matched formation top, and each point in the proposed formation top at a given distance below the top of the proposed formation is mapped to a point in the matched formation top the same distance below the top of the matched formation top. The method 900 then proceeds to step 924 where the method 900 is completed with respect to the proposed formation top.

In step 926, the formation top data of the proposed well is examined to determine the thickness of the proposed formation top, and the formation top data of the offset well is examined to determine the thickness of the matched formation top. If the thickness of the matched formation top is less than the thickness of the proposed formation top, the method proceeds to step 928, otherwise the method proceeds to step 932.

In step 928, the proposed formation top is mapped to the matched formation top in a proportional manner, as graphically depicted in FIG. 10A. Specifically, the bottom of the proposed formation top is mapped to the bottom of the matched formation top, the top of the proposed formation top is mapped to the top of the matched formation top, and each point at a first distance above the bottom of the proposed formation top is mapped to a second point in the matched formation top above the bottom of the matched formation top, such that d2=d1*(the thickness of the of the matched formation top)/(the thickness of the proposed formation top). The method 900 then proceeds to step 930 where the method 900 is completed with respect to the proposed formation top.

Figure 10C:
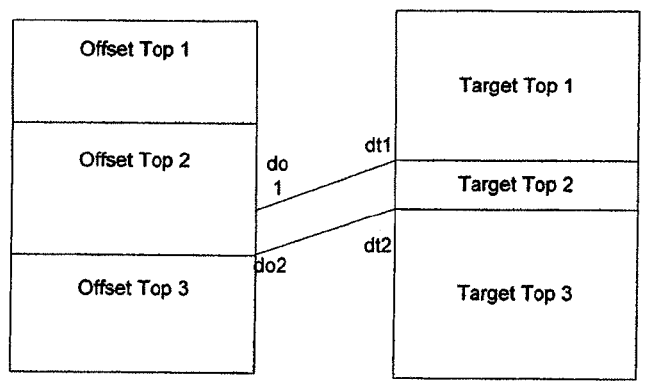

In step 932, the proposed formation top is mapped to the matched offset formation top in a one-to-one depthwise manner starting at the bottom of the selected proposed formation top, as graphically depicted in FIG. 10C. Specifically, the bottom of the proposed formation top is mapped to the bottom of the matched formation top, and each point in the proposed formation top at a given distance above the bottom of the proposed formation is mapped to a point in the matched formation top the same distance above the above the bottom of the matched formation top. The method 900 then proceeds to step 934.

In step 934, the depth of the proposed formation top is compared to the depth of the duplicated formation top in the formation data of the proposed well identified in step 904. If the duplicated top is at a shallower depth than the proposed formation top, then the method 900 proceeds to step 938, otherwise, the method 900 proceeds to step 936 and is completed with respect to the proposed formation top.

In step 938, the duplicated formation top in the formation data of the proposed well identified in step 904 is mapped to the matched offset top. The method 900 then proceeds to step 940 where the method 900 is completed with respect to the proposed formation top.

The compose controller 808 manages the display and functionality of the compose screen 800 as described above. The controller 808 is communicatively coupled to the ARS selection component 818, the normalization component 820, and the database controller 810. When the screen 800 is initially displayed to a user, the controller 808 directs the normalization component 820 to generate the data required to graph the normalized ARS graph 618, 620 for each offset well as described above. In addition, when the user interacting with screen 600 selects an automatic selection function from the automatic selection drop-down list 644, the controller 808 directs the ARS selection component 818 to determine the appropriate selection of the sections 630 of the normalized ARS graphs 618, 620. Further, once a user has completed the selection and transfer of the normalized lithology data and ARS data from the offset wells to predict the physical attributes of the proposed well, the controller 808 directs the database controller 810 to store the normalized lithology data and ARS data in the UI data structure.

The ARS selection component 818 applies the automatic selection function selected by a user from the automatic selection drop-down list 644 in screen 600. In the present embodiment, the automatic selection functions comprise: maximum average ARS, minimum average ARS, all of selected well, clear and custom, as defined above with respect to screen 600. Alternatively, other automatic selection functions may be provided by the ARS selection component 818, such as, for example, averaging the ARS data and lithology data of corresponding mapped portions of two or more offset wells, or applying a weighted average of the ARS data and lithology data each mapped portion of for two or more offset wells based on the distance of the offset well from the proposed well.

The normalization component 820 executes a normalization method that normalizes mapped portions of lithology data and ARS data of the offset wells to corresponding mapped portions of the formation data of the proposed well. The normalization method first identifies the depths of the top and bottom of each mapped portion of the proposed formation top graph 310 and offset FTL graph 306. The method then translates and linearly scales the data points in the mapped portions of the offset FTL graph 306 to corresponding mapped portions in the proposed formation top graph 310 according to the following equation:

$$d_o\text{new} = d_p\text{top} + (d_o\text{old} - d_o\text{top})/(d_o\text{top} - d_o\text{bot}) \times (d_p\text{top} - d_p\text{bot}) \quad (1)$$

wherein, $d_o$new is the new depth of a data point in a mapped portion of the offset FTL graph 306 after the normalization of the data point to the corresponding mapped portion of the proposed formation top graph 310, $d_o$old is the old depth of the data point, $d_p$top is the measured depth of the top of the mapped portion of the proposed formation top graph 310, $d_p$bot is the measured depth of the bottom of the mapped portion of the proposed formation top graph 310, $d_o$top is the measured depth of the top of the mapped portion of the offset FTL graph 306, and $d_o$bot is the measured depth of the bottom of the mapped portion of the offset FTL graph 306.

Alternatively, instead of linearly scaling data points in the mapped portions of the offset FTL graph 306, the data points may be resampled at specified sampling depth resampling intervals.

Figure 11:
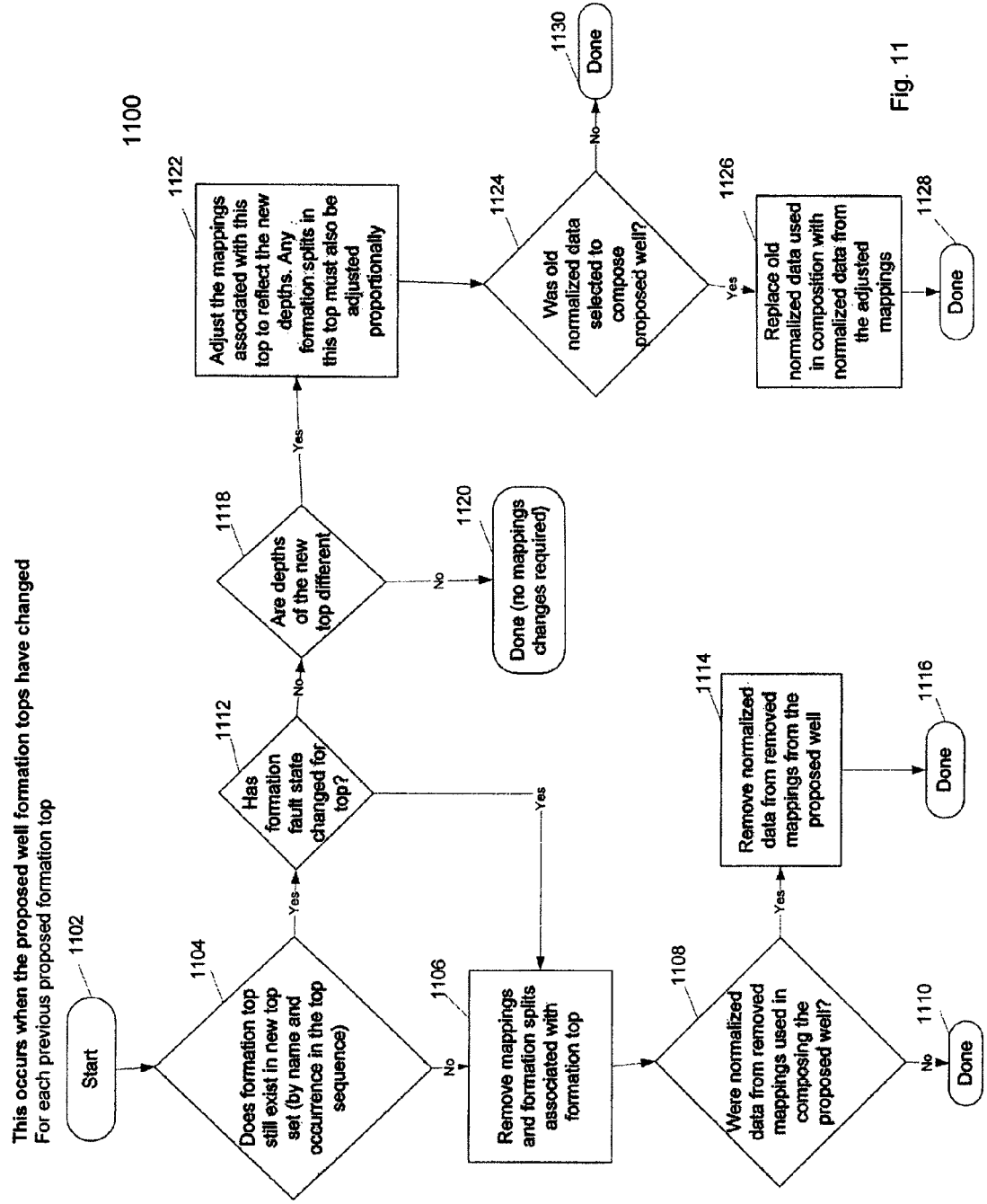
FIG. 11 is a logic diagram of an auto update mapping method according to one embodiment.

The auto update mapping component 822 is communicatively coupled to the data normalization component 820 and the database controller 810. The component 822 executes an auto update mapping function to automatically recalculate the mappings made in screen 300, and the lithology data and ARS data transferred to the proposed well in screen 600, in response to a subsequent change by the user to the formation data for the proposed well using screen 100. Referring to FIG. 11, a logic diagram is provided describing the steps of the auto update mapping method 1100 performed by the auto update mapping component 822 for each previous formation top identified in the previous formation top data for the proposed well. For the purpose of describing method 1100, all data, graphs and elements that were determined prior to the modification of the formation data are referred to as "previous" data, graphs and elements, respectively, whiles, all data, graphs and elements modified or recalculated from its previous state are referred to as "updated" data, graphs and elements, respectively.

In step 1102, the method 1100 is commenced for a selected previous formation top of the previous formation data of the proposed well. The method 1100 then proceeds to step 1104 where the updated formation data is searched to determine if the previous formation top is present in the updated formation data by comparing the name of the previous formation top against the names of the formation tops identified in the updated formation top data. If the previous formation top is preset in the updated formation top data, the method 1100 proceeds to step 1112, otherwise the method 1100 proceeds to step 1106.

In step 1106, all mappings and splits associated with the previous formation top in screen 300 are removed. The method 1100 then proceeds to step 1108, where it is determined if any normalized lithology data and ARS data associated with any portion of the offset FTL graph 306 that had been previously mapped to a portion of the previous formation top in the previous proposed formation top graph 310, had been transferred to the proposed well in screen 600. If such data had been transferred the method 1100 proceeds to step 1114, otherwise the method proceeds to step 1110 where the method 1100 is completed with respect to the selected previous formation top.

In step 1114, the transferred normalized lithology data and ARS data identified in step 1108 is removed and the method proceeds to step 1110 where the method 1100 is completed with respect to the selected previous formation top.

In step 1112, it is determined whether the geological fault state of the updated formation top identified in step 1104 has changed from the geological fault state of the previous formation top. If the fault state has changed, the method 1100 proceeds to step 1106, otherwise the method 1100 proceeds to step 1118.

In step 1118, the top and bottom depths of the previous formation top and the updated formation top are compared. If the top and bottom depths of the previous formation top and the updated formation top are different, the method 1100 proceeds to step 1122, otherwise the method 1100 proceeds to step 1120 where the method 1100 is completed with respect to the selected previous formation top.

In step 1122, the mappings of portions of the previous formation top in the proposed formation graph 310 of screen 300 are updated to reflect the change in top and/or bottom depths of the updated formation top. Specifically, the starting depth 338A and/or ending depth 338B of mapped section 336 mapping the affected portions of the proposed formation graph 310 are updated to reflect the change in the top and/or bottom depths. In addition, the depth of any splits 333 in the previous formation top in the proposed formation graph 310 are updated in a proportional manner through the application of Equation 1, with the adjustment that $d_o$ represents updated formation top and $d_p$ represents the previous formation top.

The method 1100 then proceeds to step 1124, where it is determined if any normalized lithology data and ARS data associated with any portion of the offset FTL graph 306 that is mapped to a portion of the previous formation top in the previous proposed formation top graph 310, and for which the mapping has been update in step 1122, had been transferred to the proposed well in screen 600. If such data had been transferred the method 1100 proceeds to step 1124, otherwise the method proceeds to step 1130 where the method 1100 is completed with respect to the selected previous formation top.

In step 1126, the method 1100 directs the data normalization component 820 to re-normalize the previous transferred and normalized lithology data and ARS data identified in step 1124 using the normalization method described above. The method then method proceeds to step 1128 where the method 1100 is completed with respect to the selected previous formation top.

After the auto update mapping method 1100 has been executed for each previous formation top identified in the previous formation top data for the proposed well, the auto update mapping component 822 directs the database controller 810 to store in the UI data structure any data that has been updated by the method 110, including any updated mapping data and updated normalized lithology data and ARS data.

Figure 12:
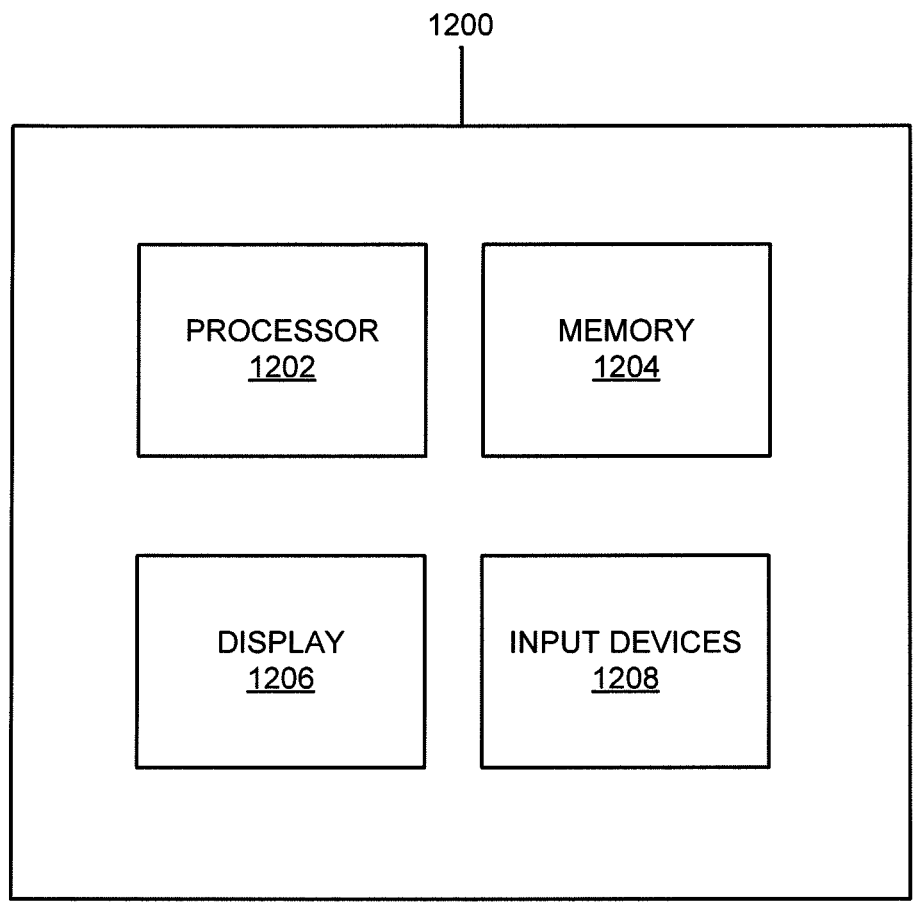
FIG. 12 is system diagram of a system for providing a UI for predicting the physical attributes of a proposed well according to one embodiment.

Referring to FIG. 12, a system diagram of a system for providing a UI for predicting the physical attributes of a proposed well is generally shown as item 1200. The system generally comprises a processor 1202, a memory 1204, a display 1206, and one or more input devices 1208. The input devices 1208 may comprise any electronic device for receiving information from a user, such as, for example, a keyboard, a mouse pointer, or a touch-screen. The software components 802 to 822 described above are stored in the memory 1204 and executed by the processor 1202 to provide the UI describe above. In the present embodiment, the system is a general purpose computer.

While a particular embodiment of the present invention has been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiment. For example, while the embodiments described herein disclose providing a UI for predicting the lithology data and ARS data of a proposed well, it is to be understood that the UI may be used to predict other physical attributes of a proposed well based on the physical attributes of offset wells.

Further, while the embodiment herein have described the use of specific input and display elements in the UI, it is to be understood that these input and display elements can be replaced with other appropriate input and display elements known in the art, such as for example, buttons, menus, icons, check boxes, combo boxes, drop-down lists, grid views, list boxes, radio buttons, scrollbars, sliders, spinners, text boxes, balloons, heads-up displays, infobars, labels, loading screens, progress bar, splash screens, status bars, throbbers, toasts, tooltips, accordions, disclosure widgets, menu bars, panels, ribbons, tabs, toolbars, windows, hyperlinks, tree views, and dialog boxes.

What is claimed:

1. A method of providing a user interface on a display for predicting the physical attributes of a proposed well, the method comprising:
   (a) displaying, on a display and using a processor, an offset formation top graph of formation top data for at least one offset well and a proposed formation top graph of the formation data for the proposed well;
   (b) mapping, using the processor, one or more portions of the offset formation top graph to one or more portions of the proposed formation top graph, each mapped portion of the offset formation top graph mapped to an associated mapped portion of the proposed formation top graph;
   (c) normalizing, using the processor, physical attribute data associated with each mapped portion of the offset formation top graph to the associated mapped portion of the proposed formation top graph;
   (d) displaying, on the display and using the processor, a normalized physical attribute graph of the normalized physical attribute data associated with each mapped portion of the offset formation top graph;
   (e) selecting, using the processor, one or more portions of the normalized physical attribute graph; and
   (f) determining, using the processor, the physical attribute data for the proposed well as the selected portions of the normalized physical attribute graph,
wherein the normalizing modifies the depth associated with each element of the physical attribute data by performing a linear interpolation based upon the depths of the mapped portion of the offset formation top graph and the depths of the associated mapped portion of the proposed formation top graph.

2. The method of claim 1, wherein the at least one offset well comprises a plurality of offset wells.

3. The method of claim 1, wherein the physical attribute data is apparent rock strength data.

4. The method of claim 1, wherein each of the one or more portions of the offset formation top graph represent a formation top of the offset well and each of the one or more portions of the proposed formation top graph represent a formation top of the proposed well.

5. The method of claim 4, wherein the mapping is based upon matching the name of each formation top in the formation top data for the proposed well to the names of the formation tops in the formation top data for the at least one offset wells.

6. A system providing a user interface for predicting the physical attributes of a proposed well, the system comprising:
   (a) a display;
   (b) a processor communicatively coupled to the display and the input device;
   (c) a memory communicatively coupled to the processor, the memory having statements and instructions stored therein for execution by the processor to:
      (i) display on the display an offset formation top graph of formation top data for at least one offset well and a proposed formation top graph of formation data for the proposed well;
      (ii) map one or more portions of the offset formation top graph to one or more portions of the proposed formation top graph, each mapped portion of the offset formation top graph mapped to an associated mapped portion of the proposed formation top graph;
      (iii) normalize physical attribute data associated with each mapped portion of the offset formation top graph to the associated mapped portion of the proposed formation top graph;
      (iv) display on the display a normalized physical attribute graph of the normalized physical attribute data associated with each mapped portion of the offset formation top graph;
      (v) select one or more portions of the normalized physical attribute graph; and
      (vi) determine the physical attribute data for the proposed well as the selected portions of the normalized physical attribute graph,
   wherein the normalizing modifies the depth associated with each element of the physical attribute data by performing a linear interpolation based upon the depths of the mapped portion of the offset formation top graph and the depths of the associated mapped portion of the proposed formation top graph.

7. The system of claim 6, wherein the at least one offset well comprises a plurality of offset wells.

8. The system of claim 6, wherein the physical attribute data is apparent rock strength data.

9. The system of claim 6, wherein each of the one or more portions of the offset formation top graph represent a formation top of the offset well and each of the one or more portions of the proposed formation top graph represent a formation top of the proposed well.

10. The system of claim 9, wherein the mapping is based upon matching the name of each formation top in the formation top data for the proposed well to the names of the formation tops in the formation top data for the at least one offset wells.

11. A non-transitory computer-readable medium having statements and instructions stored therein for execution by a processor to:
   (a) display an offset formation top graph of formation top data for at least one offset well and a proposed formation top graph of formation data for the proposed well;
   (b) map one or more portions of the offset formation top graph to one or more portions of the proposed formation top graph, each mapped portion of the offset formation top graph mapped to an associated mapped portion of the proposed formation top graph;

(c) normalize physical attribute data associated with each mapped portion of the offset formation top graph to the associated mapped portion of the proposed formation top graph;
(d) display a normalized physical attribute graph of the normalized physical attribute data associated with each mapped portion of the offset formation top graph;
(e) select one or more portions of the normalized physical attribute graph; and
(f) determine the physical attribute data for the proposed well as the selected portions of the normalized physical attribute graph, wherein the normalizing modifies the depth associated with each element of the physical attribute data by performing a linear interpolation based upon the depths of the mapped portion of the offset formation top graph and the depths of the associated mapped portion of the proposed formation top graph.

12. The medium of claim 11, wherein the at least one offset well comprises a plurality of offset wells.

13. The medium of claim 11, wherein the physical attribute data is apparent rock strength data.

14. The medium of claim 11, wherein each of the one or more portions of the offset formation top graph represent a formation top of the offset well and each of the one or more portions of the proposed formation top graph represent a formation top of the proposed well.

15. The medium of claim 14, wherein the mapping is based upon matching the name of each formation top in the formation top data for the proposed well to the names of the formation tops in the formation top data for the at least one offset wells.

* * * * *